(12) United States Patent
Liu et al.

(10) Patent No.: US 12,719,313 B2
(45) Date of Patent: Aug. 25, 2026

(54) SMART WIRELESS CHARGING CONTROL SYSTEM

(71) Applicant: E Ink Holdings Inc., Hsinchu (TW)

(72) Inventors: Chuen-Jen Liu, Hsinchu (TW); Jia-Hong Xu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 992 days.

(21) Appl. No.: 17/857,040

(22) Filed: Jul. 4, 2022

(65) Prior Publication Data

US 2023/0135257 A1 May 4, 2023

(30) Foreign Application Priority Data

Nov. 2, 2021 (TW) ................................ 110140698

(51) Int. Cl.
*H02J 50/80* (2016.01)
*H02J 7/42* (2026.01)
*H02J 50/90* (2016.01)

(52) U.S. Cl.
CPC ................ *H02J 50/80* (2016.02); *H02J 7/42* (2026.01); *H02J 50/90* (2016.02)

(58) Field of Classification Search
CPC ....................................................... H02J 50/40
See application file for complete search history.

(56) References Cited

U.S. PATENT DOCUMENTS 5,945,948 A * 8/1999 Buford .................... G01S 5/021 342/457
7,133,645 B2 * 11/2006 Thermond ........... H04B 7/0617 343/702
8,447,234 B2 * 5/2013 Cook ...................... H02J 50/23 455/571
10,554,052 B2 2/2020 Bell et al.
10,700,531 B2 6/2020 Lee et al.
10,797,537 B2 * 10/2020 Chowdhury ............ H02J 50/12
10,855,321 B2 12/2020 Zalewski et al.
10,958,080 B2 3/2021 Lee et al.
2013/0314036 A1 * 11/2013 Nakagawa .......... H02J 7/00036 320/108

(Continued)

FOREIGN PATENT DOCUMENTS

CN 106230049 12/2016
CN 107294158 10/2017

(Continued)

OTHER PUBLICATIONS

CN-107294158_translation, a Wireless Charging Control Method and Wireless Charging Router, Liu, (Year: 2017).*

(Continued)

*Primary Examiner* — Tynese V Mcdaniel
(74) *Attorney, Agent, or Firm* — JCIPRNET

(57) ABSTRACT

A smart wireless charging control system including at least one receiver and a transmitter is provided. The receiver is configured to receive a charging signal to be charged and to start operating. The transmitter is configured to transmit the charging signal to scan the receiver to charge the receiver during an initialization period. During the initialization period, the transmitter rotates an angle for transmitting the charging signal by the transmitter and records a time of transmitting the charging signal and the angle for transmitting the charging signal.

8 Claims, 4 Drawing Sheets

(56) References Cited

U.S. PATENT DOCUMENTS

| | | | | |
|---|---|---|---|---|
| 2014/0239733 | A1* | 8/2014 | Mach | H02J 50/12 307/104 |
| 2015/0204928 | A1* | 7/2015 | Hoover | H02J 7/0042 320/108 |
| 2015/0244199 | A1* | 8/2015 | Chen | H02J 50/20 320/108 |
| 2016/0308625 | A1* | 10/2016 | Chen | H04W 48/20 |
| 2018/0301940 | A1* | 10/2018 | Yeo | H02J 50/60 |
| 2019/0386505 | A1* | 12/2019 | Lin | H04W 12/08 |

FOREIGN PATENT DOCUMENTS

| | | | | |
|---|---|---|---|---|
| CN | 107294158 A | * | 10/2017 | H02J 50/20 |
| CN | 108695934 A | * | 10/2018 | H02J 50/60 |
| CN | 108711949 | | 10/2018 | |
| CN | 110601280 | | 12/2019 | |
| GB | 2528911 | * | 2/2016 | H02J 50/80 |
| TW | 201731329 | | 9/2017 | |
| TW | I614965 | | 2/2018 | |
| TW | 202002459 | | 1/2020 | |
| WO | 2016020645 | | 2/2016 | |

OTHER PUBLICATIONS

CN-108695934_translation, Hong, Wireless Charging Management Method (Year: 2018).*

“Office Action of Taiwan Counterpart Application”, issued on Jul. 13, 2022, p. 1-p. 6.

“Office Action of China Counterpart Application”, issued on Apr. 10, 2025, p. 1-p. 9.

* cited by examiner

SMART WIRELESS CHARGING CONTROL SYSTEM

CROSS-REFERENCE TO RELATED APPLICATION

This application claims the priority benefit of Taiwanese application no. 110140698, filed on Nov. 2, 2021. The entirety of the above-mentioned patent application is hereby incorporated by reference herein and made a part of this specification.

BACKGROUND

Technical Field

The disclosure relates to a charging control system. Particularly, the disclosure relates to a smart wireless charging control system.

Description of Related Art

Currently, wireless charging is passive in nature, where a transmitting end and a receiving end are both fixedly disposed. In addition, the transmitting end transmits fixed energy, and cannot make dynamic adjustment to the energy, angle of transmission, time of sending, and the like in response to requirements of the receiving end.

SUMMARY

The disclosure provides a smart wireless charging control system, in which a transmitter can arrange schedule, adjust energy, and adjust a transmission angle according to requirements of the receiver.

A smart wireless charging control system of the disclosure includes at least one receiver and a transmitter. The receiver is configured to receive a charging signal to be charged and to start operating. The transmitter is configured to transmit the charging signal to scan the receiver and to charge the receiver during an initialization period. During the initialization period, the transmitter rotates an angle for transmitting the charging signal and records a time of transmitting the charging signal and the angle for transmitting the charging signal.

In an embodiment of the disclosure, the charging signal is configured to charge the receiver, such that the receiver has sufficient energy to start operating.

In an embodiment of the disclosure, the smart wireless charging control system further includes a cloud server. When the receiver starts operating, the receiver outputs a first notification signal to the cloud server, such that the cloud server records a respective time during which the receiver is charged.

In an embodiment of the disclosure, when scanning by the transmitter is completed, the respective time during which the receiver is charged is obtained from the cloud server. The transmitter determines the corresponding angle for transmitting the charging signal to the receiver according to the respective time during which the receiver is charged and the time of transmitting the charging signal by the transmitter.

In an embodiment of the disclosure, during an information update period, when a host system updates information of the receiver in the cloud server, the cloud server outputs a second notification signal to the transmitter to notify the transmitter to transmit the charging signal to charge the receiver.

In an embodiment of the disclosure, during the information update period, the cloud server is configured to update information stored in the receiver.

In an embodiment of the disclosure, when the information stored in the receiver is updated, the receiver outputs a third notification signal to the cloud server, such that the cloud server notifies the transmitter to stop outputting the charging signal to the receiver.

In an embodiment of the disclosure, the smart wireless charging control system further includes a motor. The motor is configured to drive the transmitter to rotate to adjust the angle for transmitting the charging signal by the transmitter.

In an embodiment of the disclosure, the receiver includes an electronic paper label. The electronic paper label is configured to display information stored in the receiver.

In an embodiment of the disclosure, the transmitter includes an electronic paper display panel. The electronic paper display panel is configured to display operation information of the transmitter.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
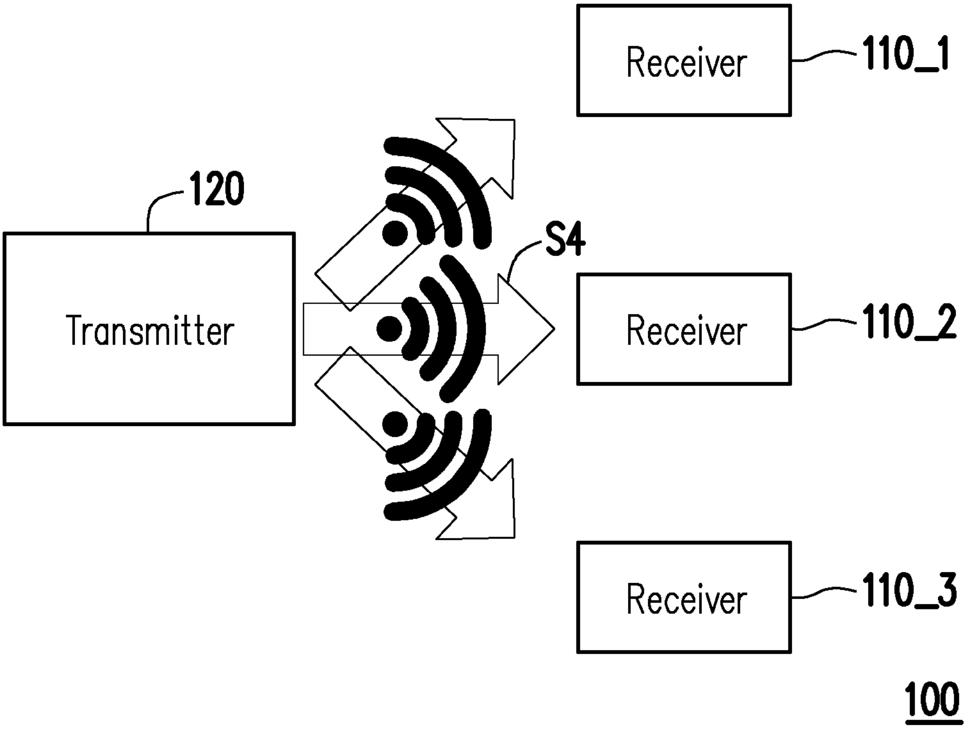
FIG. 1 is a schematic diagram showing a smart wireless charging control system according to an embodiment of the disclosure.

FIG. 1 is a schematic diagram showing a smart wireless charging control system according to an embodiment of the disclosure. With reference to FIG. 1, a smart wireless charging control system 100 of this embodiment includes receivers 110_1, 110_2, 110_3 and a transmitter 120. In FIG. 1, one transmitter 120 and three receivers 110_1, 110_2, 110_3 are taken as an example for description, but the numbers thereof are not intended to limit the disclosure. The smart wireless charging control system 100 may include one or more transmitters or receivers.

In this embodiment, the receivers 110_1, 110_2, 110_3 receive a charging signal S4 in wireless transmission to be charged and to start operating. The operation of the receivers 110_1, 110_2, 110_3 includes, for example, updating stored or displayed information or outputting signals. In an application example of electronic papers, even if they are not operating, the receivers 110_1, 110_2, 110_3 may still display information. The transmitter 120 transmits the charging signal S4 in wireless transmission during an initialization period to scan the receivers 110_1, 110_2, 110_3 and to charge the receivers 110_1, 110_2, 110_3. During the initialization period, the transmitter 120 rotates an angle for transmitting the charging signal S4 the transmitter 120 and records a time of transmitting the charging signal S4. The charging signal S4 is configured to charge the receivers 110_1, 110_2, 110_3, so that the receivers 110_1, 110_2, 110_3 have sufficient energy to start operating.

In this embodiment, by scanning the presence of the receivers 110_1, 110_2, 110_3 during the initialization period, the transmitter 120 can automatically search for locations of the receivers 110_1, 110_2, 110_3. The receivers 110_1, 110_2, 110_3 may be devices with or without batteries.

In the convention since charging control system, an angle for transmitting signals by the transmitter is fixed, the charging control system cannot dynamically adjust transmission parameters, such as the output energy, angle for transmitting the signals, and transmission time, of the transmitter according to the requirements of the receiver. Comparatively, since the transmitter 120 of this embodiment may rotate to dynamically adjust the angle for transmitting the signal, the transmitter 120 can automatically search for the locations of the receivers 110_1, 110_2, 110_3 to realize smart wireless charging.

Figure 2:
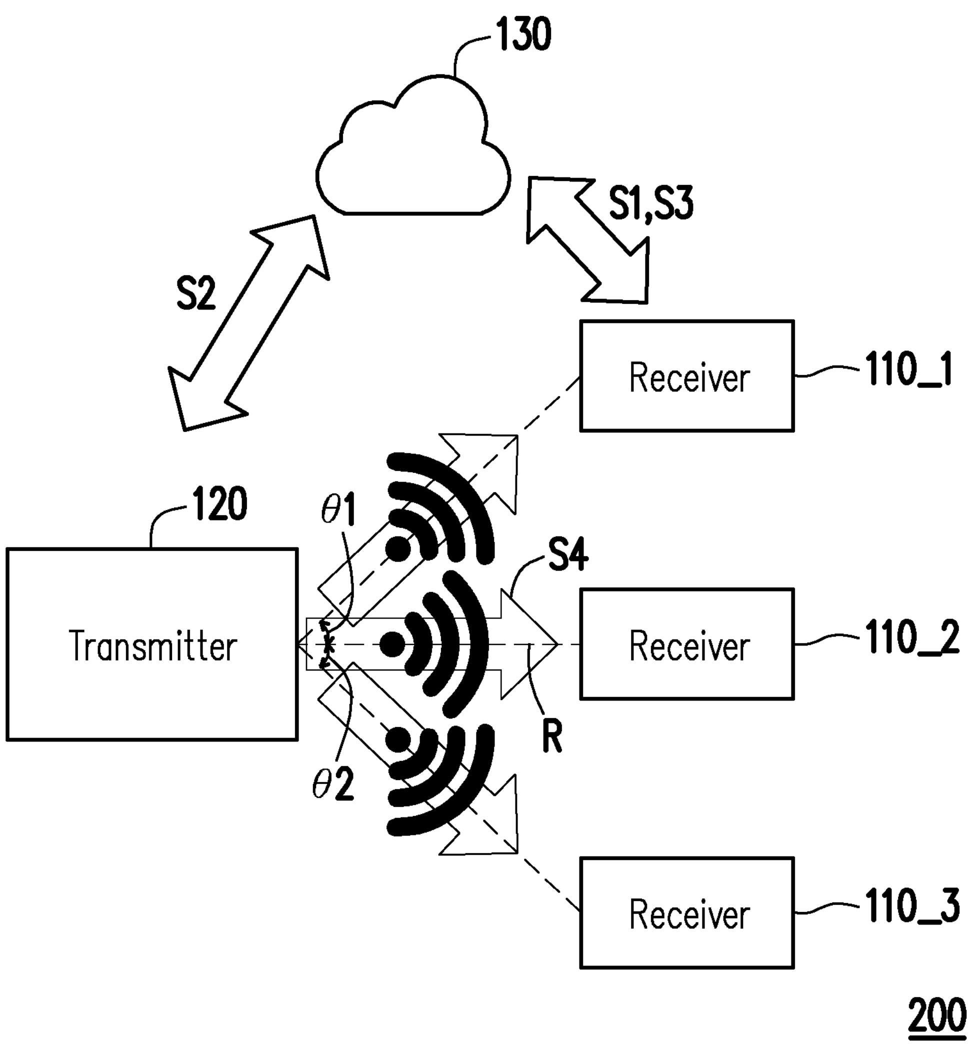
FIG. 2 is a schematic diagram showing a smart wireless charging control system according to another embodiment of the disclosure.

FIG. 2 is a schematic diagram showing a smart wireless charging control system according to another embodiment of the disclosure. With reference to FIG. 2, a smart wireless charging control system 200 of this embodiment includes the receivers 110_1, 110_2, 110_3, the transmitter 120, and a cloud server 130. The smart wireless charging control system 200 may operate during an initialization period or an information update period.

During the initialization period, the cloud server 130 is configured to record respective times during which the receivers 110_1, 110_2, 110_3 are charged. During the information update period, the cloud server 130 is configured to notify the transmitter 120 to transmit the charging signal S4 to charge at least one of the receivers 110_1, 110_2, 110_3. Moreover, during the information update period, the cloud server 130 is configured to update the information stored in the receiver.

Specifically, during the initialization period, the transmitter 120 may perform a first search (also referred to as scan). During the search, the transmitter 120 records the time and the rotation angle or the movement trajectory. For example, with a reference line R as a reference, the transmitter 120 rotates upward by an angle θ1 to find the location of the receiver 110_1, the transmitter 120 rotates downward by an angle θ2 to find the location of the receiver 1103, and when the rotation angle of the transmitter 120 is 0 (no rotation required), the location of the receiver 110_2 can be found. When any one of the receivers 110_1, 110_2, 110_3 (the receiver 110_1, for example) starts operating with sufficient energy sent by the transmitter 120, the receiver 110_1 sends a first notification signal S1 to the cloud server 130. The cloud server 130 records a time when the first notification signal S1 is received. This time indicates that the transmitter 120 may similarly charge the next receiver in sequence, such as the receiver 110_2 or 110_3. In other words, when the receivers 110_1, 110_2, 110_3 start operating, the receivers 110_1, 110_2, 110_3 outputs the first notification signal S1 to the cloud server 130, so that the cloud server 130 records the respective times during which the receivers 110_1, 110_2, 110_3 are charged.

When scanning by the transmitter 120 is completed, the transmitter 120 obtains the respective times during which the receivers 110_1, 110_2, 110_3 are charged from the cloud server 130. Then, according to the respective times during which the receivers are charged, the transmitter 120 obtains the recorded angles for transmitting the charging signal S4 corresponding to the times. In other words, the transmitter 120 determines the corresponding angles for transmitting the charging signal S4 to the receivers 110_1, 110_2, 110_3 according to the respective times during which the receivers 110_1, 110_2, 110_3 are charged and the time of transmitting the charging signal S4 by the transmitter 120. For example, the transmitter 120 may determine that the transmission angle corresponding to the receiver 110_1 is θ1, the transmission angle corresponding to the receiver 110_2 is 0, and the transmission angle corresponding to the receiver 110_3 is −θ2. With the reference line R as a reference, an upward rotation angle of the transmitter 120 is positive, and a downward rotation angle is negative. In addition, θ1 and θ2 are positive values, and may be equal or unequal. Therefore, according to the above-mentioned operation, the smart wireless charging control system 200 may complete the initialization operation. When information of a certain receiver is required to be updated at the next time, the transmitter 120 may then quickly move to that angle to charge the receiver to update the receiver.

In this embodiment, updating the data of the receivers 110_1, 110_2, 110_3 includes the following. After the energy transmitted by the transmitter 120 is obtained, the cloud server 130 is connected for the update information required by the receiver to be obtained. Specifically, during the information update period, when a user uses a host system (a computer, a mobile phone, or the like) to update the information of any one of the receivers 110_1, 110_2, 110_3 in the cloud server 130, the cloud server 130 outputs a second notification signal S2 to the transmitter 120 to notify the transmitter 120 to transmit the charging signal S4 to charge any receiver whose information is required to be updated. After having sufficient energy, the receivers 110_1, 110_2, 110_3 may download the update information from the cloud server 130.

When the information stored in the receivers 110_1, 110_2, 110_3 is updated, the receivers 110_1, 110_2, 110_3 output a third notification signal S3 to the cloud server 130, so that the cloud server 130 notifies the transmitter 120 to stop outputting the charging signal S4 to the receivers 110_1, 110_2, 110_3. In other words, when the information update ends, the receivers 110_1, 110_2, 110_3 send an end message to the cloud server 130, and the cloud server 130 then notifies the transmitter 120 to stop providing energy.

In this embodiment, FIG. 2 shows the receivers 110_1, 110_2, 110_3 and the transmitter 120 on the same plane, but the disclosure is not limited to this. In an embodiment, the receivers 110_1, 110_2, 110_3 may be distributed in a three-dimensional space instead of being on the same plane. For example, the transmitter 120 and the receiver 110_1 may be on a first plane, the transmitter 120 and the receiver 110_2 may be on a second plane, and the transmitter 120 and the receiver 110_3 may be on the third plane. Two of the first plane, the second plane, and the third plane may the same. Alternatively, the first plane, the second plane, and the third plane may be all different.

Figure 3A:
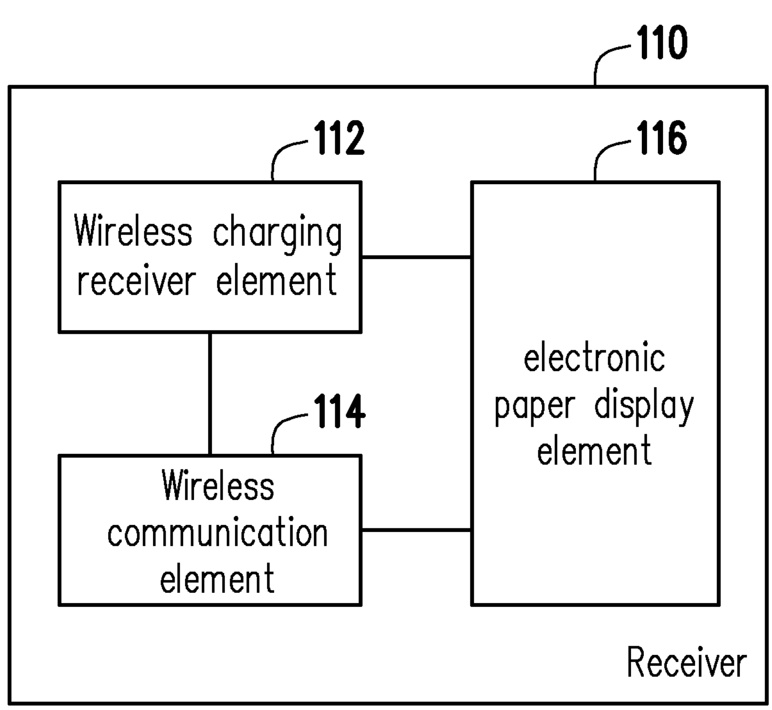
FIG. 3A is a schematic diagram showing a receiver according to an embodiment of the disclosure.

FIG. 3A is a schematic diagram showing a receiver according to an embodiment of the disclosure. With reference to FIG. 3A, a receiver 110 includes a wireless charging receiver element 112, a wireless communication element 114, and an electronic paper display element 116. The electronic paper display element 116 is, for example, an electronic paper label. The electronic paper label is configured to display information stored in the receiver 110. The wireless communication element 114 is configured to perform wireless communication operation, for example, transmitting the first notification signal S1 and the third notification signal S3, with the cloud server 130. The wireless communication element 114 includes, for example, a Wi-Fi module or a Bluetooth module. The wireless charging receiver element 112 is configured to receive the charging signal S4 as the energy required for the overall operation of the receiver 110 from the transmitter 120. The operation of the receiver 110 includes, for example, signal transmission performed by the communication element and updating the information displayed by the electronic paper label.

In an embodiment, the wireless charging receiver element 112 may be a wireless charging element of a type of, for example, radio frequency, infrared, and laser. The wireless communication element 114 may be a wireless communication element such as a wireless network or a Bluetooth module.

Figure 3B:
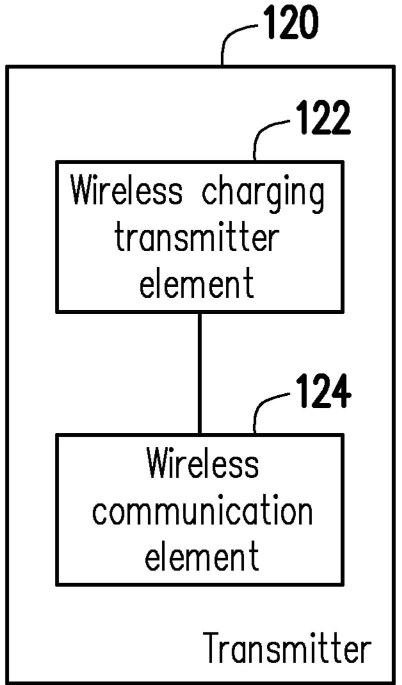
FIG. 3B is a schematic diagram showing a transmitter according to an embodiment of the disclosure.

FIG. 3B is a schematic diagram showing a transmitter according to an embodiment of the disclosure. With reference to FIG. 3B, the transmitter 120 includes a wireless charging transmitter element 122 and a wireless communication element 124. The wireless communication element 124 is configured to perform wireless communication operation, for example, transmitting the second notification signal S2, with the cloud server 130. The wireless communication element 124 includes, for example, a Wi-Fi module or a Bluetooth module. The wireless charging transmitter element 122 is configured to output the charging signal S4 as the energy required for the overall operation of the receiver 110 to be transmitted to the receiver 110.

In an embodiment, the transmitter 120 may further include an electronic paper display panel (not shown). The electronic paper display panel is configured to display operation information of the transmitter 120, including transmission parameters, such as the output energy, angle for transmitting the signals, and transmission time, of the transmitter, or including information to be updated to the receiver 110, for example. In an embodiment, the transmitter 120 may be connected to a stable power supply, so that the transmitter 120 provides sufficient and stable energy to the receiver 110.

In FIG. 3A and FIG. 3B, sufficient teaching, suggestion, and implementation description of the hardware structure of each element may be obtained from the common general knowledge in the related technical field.

Figure 4:
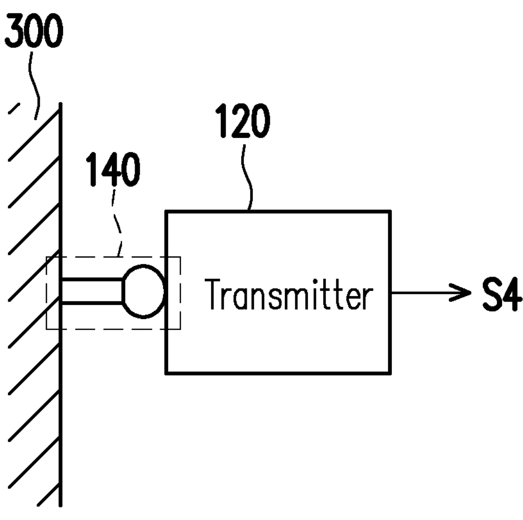
FIG. 4 is a schematic diagram showing a transmitter and a motor thereof according to an embodiment of the disclosure.

FIG. 4 is a schematic diagram showing a transmitter and a motor thereof according to an embodiment of the disclosure. With reference to FIG. 4, the smart wireless charging control system 200 further includes a motor 140. The motor 140 is presented in a form of a movable shaft, such as a movable base. The transmitter 120 is mounted on a wall 300 or the like through the movable shaft. The motor 140 is configured to drive the transmitter 120 to rotate to adjust the angle for transmitting the charging signal S4 by the transmitter 120.

Specifically, the motor 140 is connected to a processor of the transmitter 120. The processor of the transmitter 120 may control the movable base to adjust the angle required by the transmitter 120. This operation may be adjusted according to the data transmitted from the receiver 110 to the cloud server 130. For example, if it is required to charge a certain receiver 110, the transmitter 120 may perform an initialization scan, using the movable base to perform a multi-angle scan. When the receiver 110 receives sufficient energy, the receiver 110 continuously transmits an energy status to the cloud server 130. According to the information of the cloud server 130, the transmitter 120 records the amount of energy of the receiver corresponding to each angle. According to the scan results, the angle at which the receiver 110 obtains the maximum energy may be obtained. The transmitter 120 automatically adjusts to that angle to charge the receiver 110 and does not stop supplying energy until the receiver 110 sends an instruction to end the charging.

In the embodiments of the disclosure, a possible application scenario is described as follows. The receiver 110 may include one or more receivers. The receiver 110 serves as an electronic label which can be attached on commodities or shelves in a shopping mall, and is configured to display, for example, the name, price, and other information, of the commodities. After the electronic label is set up, the transmitter 120 may perform an initialization operation to obtain a location of the electronic label, so as to obtain a transmission angle. After that, when the user needs to update the commodity information, the commodity information stored in the cloud server 130 may be updated through a computer, a mobile phone, or a similar host system. Then, the cloud server 130 notifies the transmitter 120 to provide sufficient energy to charge the electronic label. When having sufficient energy, the electronic label may download the update information from the cloud server 130 during the information update period. Subsequently, when the location of the electronic label is reset, the transmitter 120 may perform the initialization operation again to obtain the newly set location of the electronic label. The application scenarios of the disclosure may include but are not limited to the scenario described above.

In summary of the foregoing, in the embodiment of the disclosure, during the initialization period, the transmitter rotates the angle for transmitting the charging signal by the transmitter and records the time of transmitting the charging signal and the angle for transmitting the charging signal. During the information update period, the transmitter transmits the charging signal according to the location of the receiver to charge the receiver to be updated, so that the receiver has sufficient energy to download the information to be updated from the cloud server. Therefore, the transmitter can arrange the schedule, adjust the energy, and adjust the transmission angle according to the requirements of the receiver.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A smart wireless charging control system, comprising:

at least one receiver configured to receive a charging signal to be charged and to start operating;

a transmitter configured to transmit the charging signal to scan the at least one receiver and to charge the at least one receiver during an initialization period; and a cloud server, wherein during the initialization period, the transmitter rotates an angle for transmitting the charging signal and records a time of transmitting the charging signal, the angle for transmitting the charging signal, and an energy status of the at least one receiver, wherein when the at least one receiver starts operating in response to the charging signal transmitted at the recorded time of transmitting the charging signal by the transmitter, the at least one receiver outputs a first notification signal to the cloud server, such that the cloud server records a time during which at least one the receiver is charged, wherein when scanning by the transmitter is completed, the transmitter obtains the time during which the at least one receiver is charged from the cloud server, and the transmitter determines the corresponding angle for transmitting the charging signal to provide maximum energy to the at least one receiver based on the energy status and the recorded angles for transmitting the charging signal by the transmitter according to the obtained time during which the at least one receiver is charged and the recorded time of transmitting the charging signal by the transmitter.

2. The smart wireless charging control system described in claim 1, wherein the charging signal is configured to charge the at least one receiver, such that the at least one receiver has sufficient energy to start operating.

3. The smart wireless charging control system described in claim 1, wherein during an information update period, when a host system updates an information of the at least one receiver in the cloud server, the cloud server outputs a second notification signal to the transmitter to notify the transmitter to transmit the charging signal to charge the at least one receiver.

4. The smart wireless charging control system described in claim 3, wherein during the information update period, the cloud server is configured to update the information stored in the at least one receiver.

5. The smart wireless charging control system described in claim 4, wherein when the information stored in the at least one receiver is updated, the at least one receiver outputs a third notification signal to the cloud server, such that the cloud server notifies the transmitter to stop outputting the charging signal to the at least one receiver.

6. The smart wireless charging control system described in claim 1, further comprising a motor configured to drive the transmitter to rotate to adjust the angle for transmitting the charging signal by the transmitter.

7. The smart wireless charging control system described in claim 1, wherein the at least one receiver comprises an electronic paper label configured to display an information stored in the receiver.

8. The smart wireless charging control system described in claim 1, wherein the transmitter comprises an electronic paper display panel configured to display an operation information of the transmitter.

* * * * *